United States Patent [19]

Ikeda

[11] Patent Number: 5,003,240

[45] Date of Patent: Mar. 26, 1991

[54] METHOD AND DEVICE FOR CONTROLLING HEADREST

[75] Inventor: Tetsuo Ikeda, Akishima, Japan

[73] Assignee: Tachi-S Co., Ltd., Akishima, Japan

[21] Appl. No.: 507,149

[22] Filed: Apr. 10, 1990

[51] Int. Cl.⁵ .............................................. G05B 19/28
[52] U.S. Cl. .................................. 318/603; 318/568.1; 318/466; 318/467; 318/468; 297/403; 297/408; 297/410; 364/424.05
[58] Field of Search ................ 318/568, 55, 467, 434, 318/466, 469, 468, 484, 443, 15; 297/330, 374, 408, 61, 391, 410, 409, 284, 65.1; 364/424.05, 174, 425; 180/6.5, 907; 280/808

[56] References Cited

U.S. PATENT DOCUMENTS

| | | |
|---|---|---|
| 4,401,928 | 8/1983 | Kamijo et al. ...................... 318/466 |
| 4,467,252 | 8/1984 | Takeda et al. ..................... 318/568.1 |
| 4,645,233 | 2/1987 | Bruse et al. ....................... 318/568.1 |
| 4,711,494 | 12/1987 | Duvenkamp ..................... 297/403 X |
| 4,797,824 | 1/1989 | Sugiyama et al. ............. 364/424.05 |
| 4,807,934 | 2/1989 | Sakakibara et al. ............ 297/410 X |
| 4,811,226 | 3/1989 | Shinohara ...................... 318/466 X |
| 4,812,838 | 3/1989 | Tashiro et al. ................. 364/424.05 |

Primary Examiner—Paul Ip
Attorney, Agent, or Firm—Oldham & Oldham Co.

[57] ABSTRACT

A method and device for controlling a headrest, in which the headrest is controlled its displacement between the use and non-use positions and its fore-and-aft adjustment, independently of each other, and the corresponding displacement ranges and fore-and-aft adjustment ranges of the headrest are detected and limited by a headrest angle detector.

5 Claims, 8 Drawing Sheets

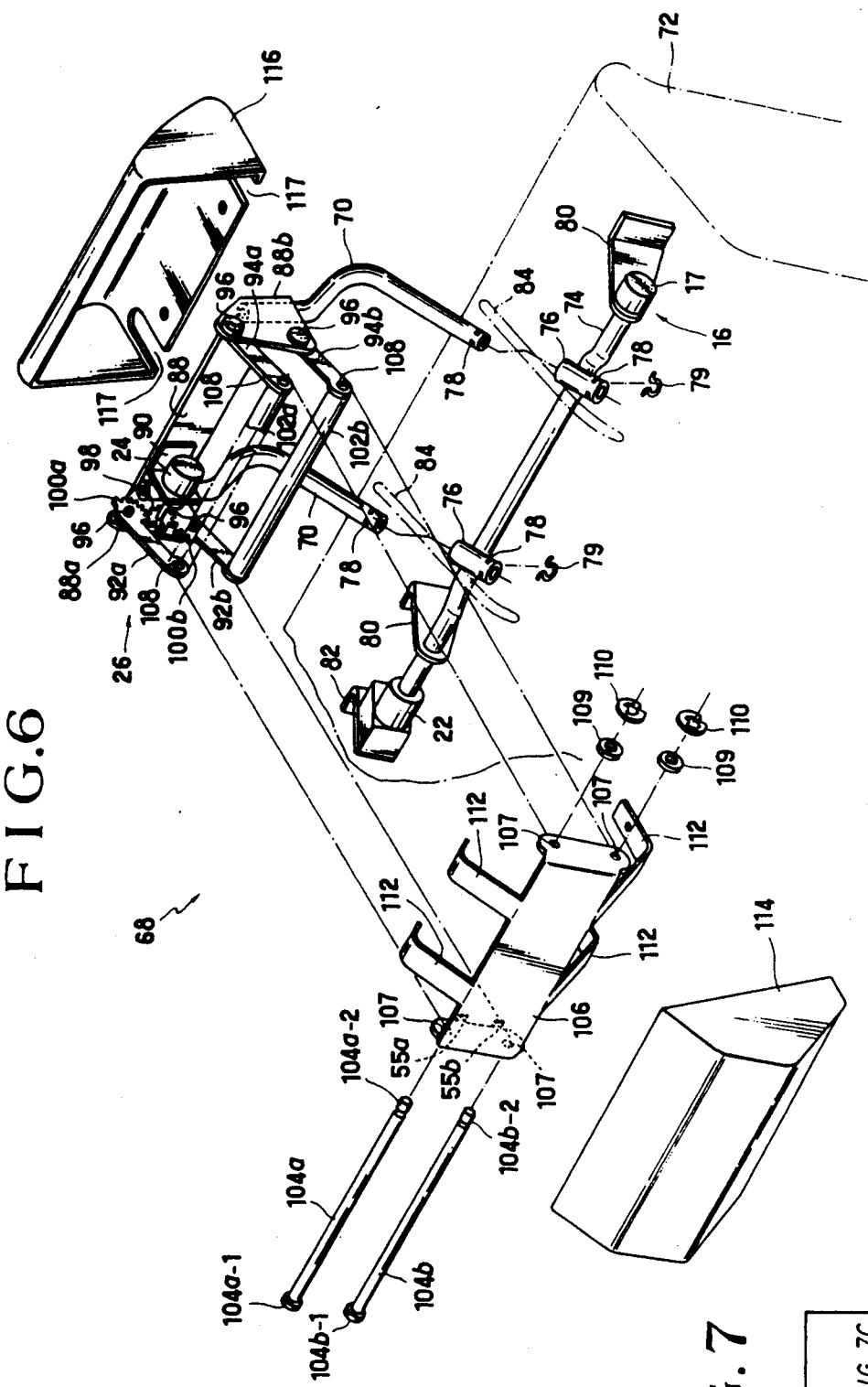
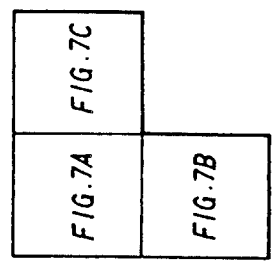

METHOD AND DEVICE FOR CONTROLLING HEADREST

BACKGROUND OF THE INVENTION

1. Field of the Invention

The present invention relates to a method and device for controlling a headrest of an automotive seat so as to move the same to a non-use position where it is lowered away from the view field of an occupant on the seat, thereby enabling him or her to attain a good view over the seat back.

2. Description of Prior Art.

There has been known a movable headrest for an automotive seat, which is moved by a motor under a switching control, so that the headrest body may adjustably be displaced to a use position upon the top of the seat back, where the headrest body erects thereon to readily support the head of an occupant sitting on the seat, or to a non-use position where the headrest body is located away from the forward view field of another occupant sitting on the other seast. Conventionally, in this sort of headrest device, an automatic operation switch is provided for effecting such headrest displacement with one-touch operation, and therefore, a driver on a front seat can operate this switch to cause a headrest on a rear seat to rotate forwardly below his or her backward sight line, to attain a good backward view field over the rear seat and further, an occupant sitting on the rear seat can cause the same displacement of a headrest on the front seat to a point below the forward sight line, by operation of the automatic operation switch, to secure a good forward view field over the front seat. On the other hand, the headrest body can be returned from that non-use position to the use position, through one-touch switching operation of the automatic switch.

According to this ordinary movable headrest device, the movable range of the headrest body between the use and non-use positions is limited by two associated limit switch, one of which is for limiting the movement of the headrest body to the use position and the other of which is for limiting that of the headrest body to the non-use position. Further, a manual adjustment switch is provided to enable adjustment of the headrest body in height and fore-and-aft positions, and thus includes a height adjustment switch area connected electrically with its associated motor and adapted for energizing the motor to drive for height adjustment of the headrest body, and a fore-and-aft adjustment switch area connected likewise with its own motor and adapted for energizing the motor to drive for adjusting forward and backward positions of the headrest body relative to the seat back. As such, the headrest movement control has been found advantageous in easily displacing the headrest body between the use and non-use positions, as well as enabling vertical and horizontal adjustments of the headrest, as desired, with respect to the seat back.

However, this prior art has been with such drawback that a move range limit is only given to the headrest displacements between the use and non-use positions by way of the foregoing two limit switches, which means that such limit is not applied to the adjusting movements of the headrest body in the fore-and-aft directions which is effected by the manual adjustment switch. As a result, during the fore-and-aft adjustment, if the manual adjustment switch is kept turned on, the headrest body continues to move until it is stopped by the limit switch, raising thus the possibility that the headrest body might damage or injure an occupant on the seat, and making the occupant nervous about the movements of the headrest body.

The conventional headrest device and its related control method, in addition to the above drawback, has been found defective in having no idea as to the variation of movement speed of the headrest body in the course of displacing it between the use and non-use positions as well as adjusting the its fore-and-aft positions. In other words the respective motors for those two operations are unchangeable or fixed in rotation rate, and consequently it is impossible to offer a desirable rapid displacement of the headrest body between the use and non-use positions and slow speed for making easy the fine adjustments of the headrest body by operating the manual adjustment switch.

SUMMARY OF THE INVENTION

It is a first purpose of the present invention to provide an improved method for controlling a headrest, which offers a safety-oriented control system for protecting as occupant against the movement of the headers, and also permits a rapid displacement of the headrest between a use position and non-use position and an easy fine adjustment of the headrest in a fore-and-aft direction, relative to a seat back.

In accomplishment of such purpose, in accordance with the present invention, the method involves the steps of presetting and detecting the headrest displacement between the use and non-use positions, and independently thereof, presenting and detecting the headrest fore-and-aft movement with the use position The use and non-use positions of the headrest as well as the fore-and-aft adjustment movements of the same is detected by a headrest angle detector and limited within their respective ranges, whereby there is eliminated the possibility of the headrest being moved excessively over the given range under an erroneous operation of those automatic and manual switches, thus effectively protecting an occupant using the headrest against unexpected movement of the headrest.

Further, in the method, there is employed a voltage control circuit, by means of which a voltage to be applied to the motor is increased or decreased selectively, so as to drive the motor at a high rate or at a low rate. That is, in accordance with the invention, upon operating the automtic operation switch, the voltage is increased via such control circuit to drive the motor at a high rate, whereas upon operating the manual adjustment switch, the voltage is decreased, causing the motor to drive at a low rate. Accordingly, the headrest is rapidly displaced between the use and non-use positions, and is moved slowly for enabling an easy, precise fine adjustment of the headrest in the fore-and-aft positions.

It is a second purpose of the present invention to provide an improved device for controlling a headrest, which is improved and easy in operation.

To achieve this purpose, the device in the present invention is constructed, together with a central processing unit, to execute an inteded control of the headrest in accordance with the above-described head control method. Thus, the headrest is physically controlled in the described safety manner, so as to avoid and any overrun of the headrest, to materialize a far-improved pretection of an occupant using the headrest against erroneous movement of the headrest. Preferably, the headrest angle detector is a potentiometer which measures the rotation angle of the headrest, which permits for detecting the both headrest displacement range and headrest fore-and-aft adjustment range, independently of each other, by use of just one potentiometer, in a more precise way, which eliminates plural limit switches at relevant local points.

BRIEF DESCRIPTION OF THE DRAWINGS

FIG. 6 is a partially broken, partially exploded perspective view of a headrest drive mechanism;

DETAILED DESCRIPTION OF PREFERRED EMBODIMENT OF THE INVENTION

Figure 1:
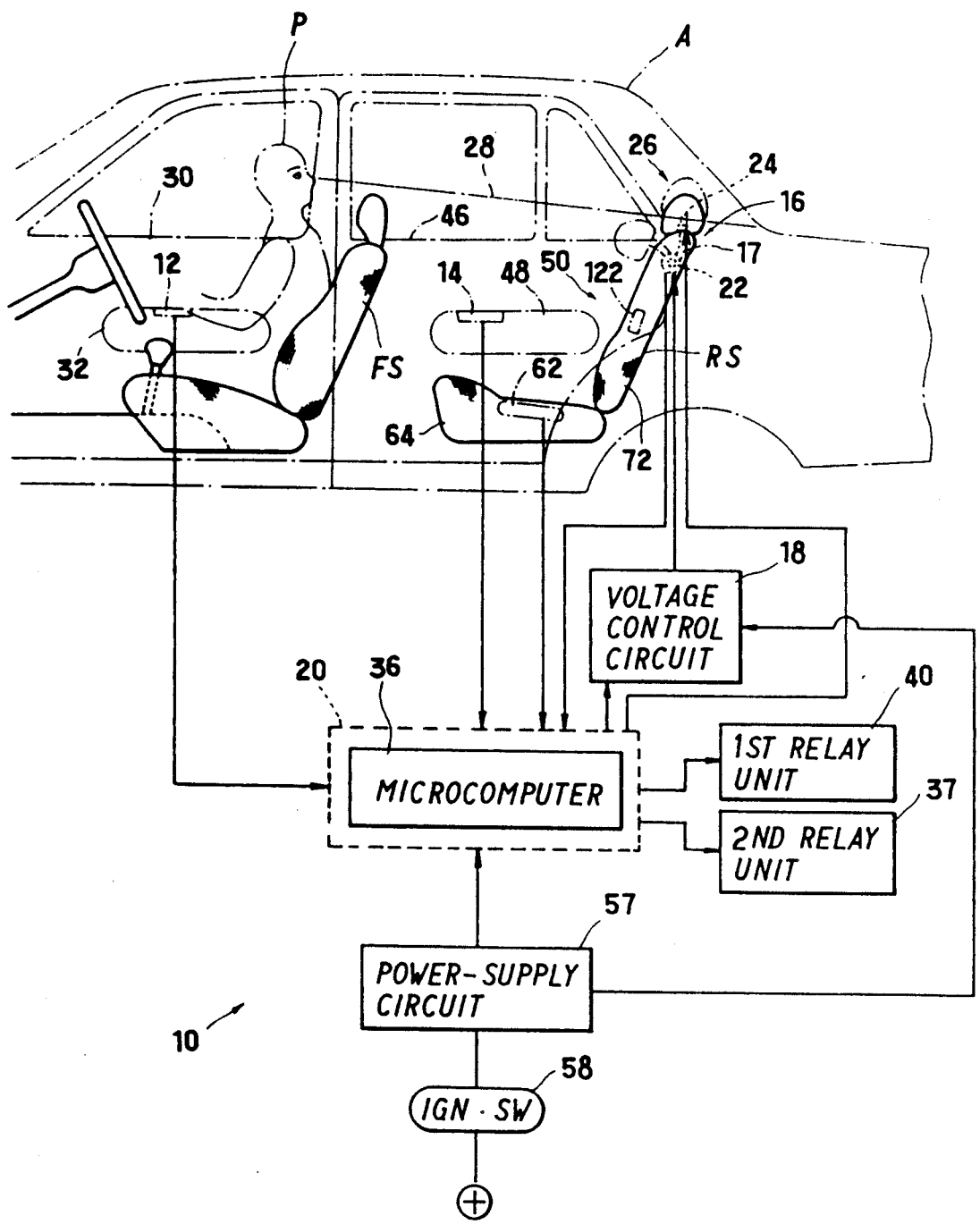
FIG. 1 is a schematic block diagram of a device for controlling a headrest in accordance with the present invention.
Figure 2:
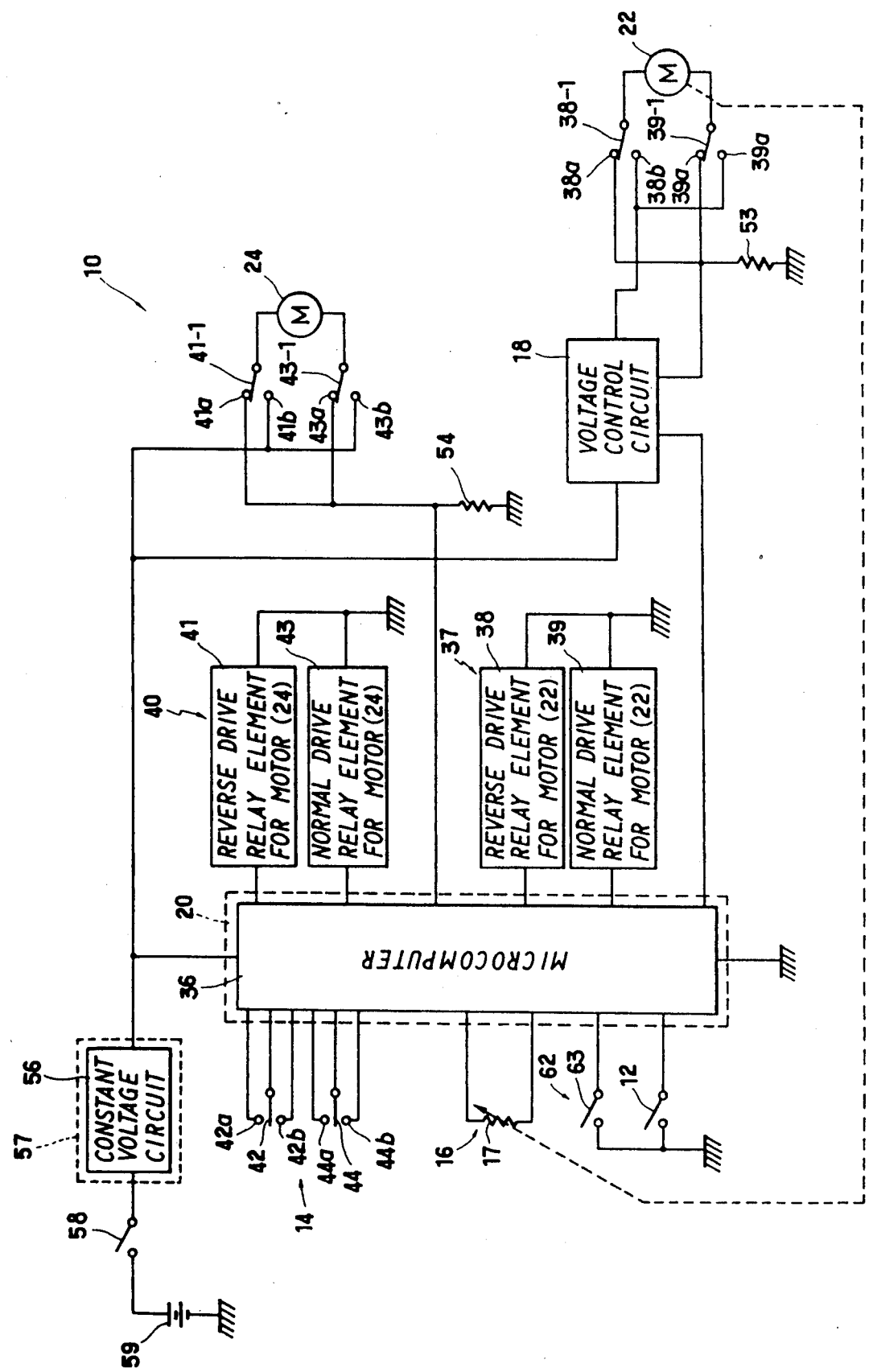
FIG. 2 is a block diagram of an electric circuit provided in the device.

Referring to FIGS. 1 and 2, there is illustrated a headrest control device (10) for controlling a movement of a headrest body (26) which is mounted on the top of a seat back (50) of a rear seat (RS) provided in an automobile (A).

The headrest control device (10) is basically comprised of an automatic operation switch (12), a manual operation switch (14), a headrest angle detector (16), a voltage control circuit (18), a central processing unit (20) to be referred as "CPU", relay units (40) (37), a headrest fore-and-aft motor (22) and a headrest elevating motor (24).

Figure 3:
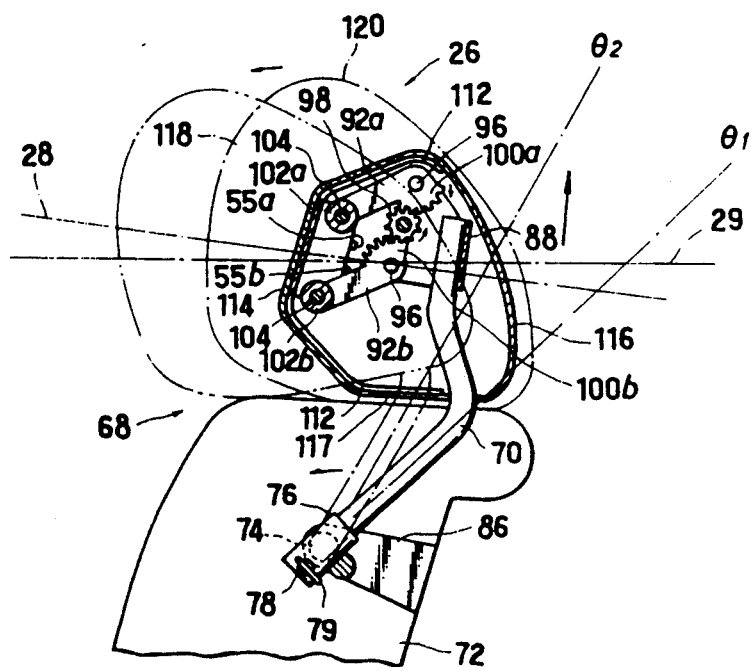
FIG. 3 is a longitudinally sectional view of a headrest, showing its use position.

The headrest body (26) is caused by the headrest fore-and-aft motor (22) to move forwardly and backwardly relative to the seat back (72), and caused by the headrest elevating motor (24) to move vertically relative to the seat back (72). Viewing FIG. 3 provides a better understanding that the headrest body (26) is caused by the former motor (24) to move between a use position where the headrest body (26) is lacated upon the top of the seat back (72), erecting thereon, as indicated in the phantom lines which show foward limit point (by two-dot chain line) and initial use position (by one-dot line, or backward limit point), and a non-sue position where the headrest body (28) is inclined downwardly and forwardly of the seat back (72) (see FIG. 4), as indicated by the two-dot chain line. Precisely stated, the headrest body (26) is caused by the headrest fore-and-aft motor (220) to rotated between those use and non-use positions, and the rotation angle ($\alpha$) assumed by the headrest body (26) between those use and non-use positions is preferably 80 degrees. Further, as shown, the headrest body (26) is to be rotated adjustably between the initial use position and a forward limit point as indicated by one-dot chain line, by the drive of the same motor (22), so that the use position of the headrest body (26) may be adjusted upon the top of the seat back (72) in the forward and backward directions relative thereto. The fore-and-aft rotation angle ($\beta$) assumed in the headrest adjusting movement is preferably about 18 degrees.

The headrest (26) is to be raised and lowered in relation to the top of the seat back (72) at the distance ($\Delta$ H). Stated otherwise, the vertical movement of the headrest body (26) is effected by the drive of the headrest elevating motor (24) only when the headrest body (26) is located within the foregoing fore-and-aft rotation angle ($\beta$), therefore, an occupant on the rear seat (RS) may adjust the vertical adjustment of the headrest body (26) within the range ($\Delta$ H) at any point within its fore-and-aft range ($\beta$), to set a best vertical location for supporting his or her head, as desired. The vertical distance or range ($\Delta$ H) is preferably about 40 mm.

Figure 4:
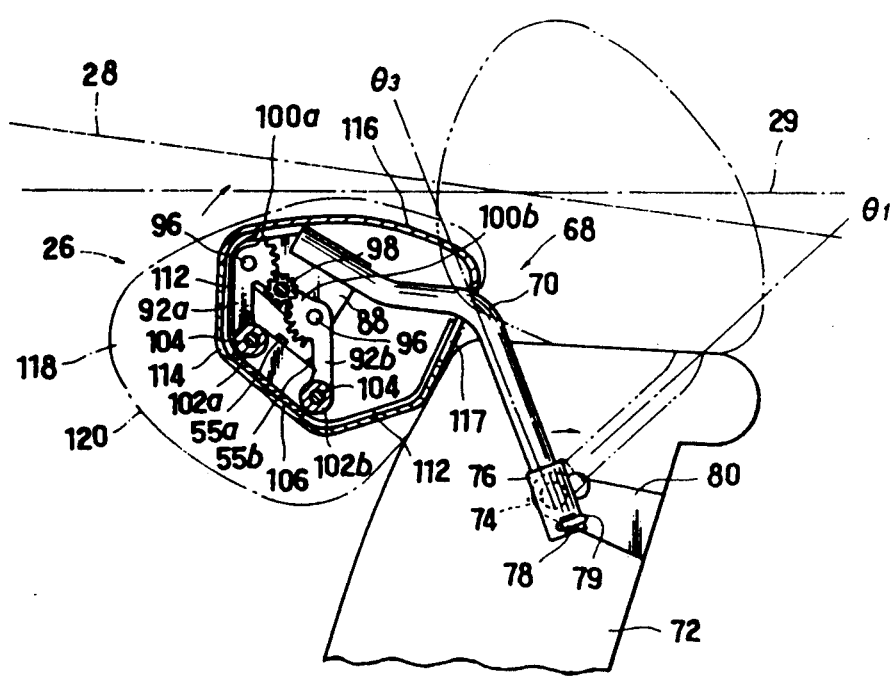
FIG. 4 is a longitudinally sectional view of the headrest, showing its non-use position.
Figure 5:
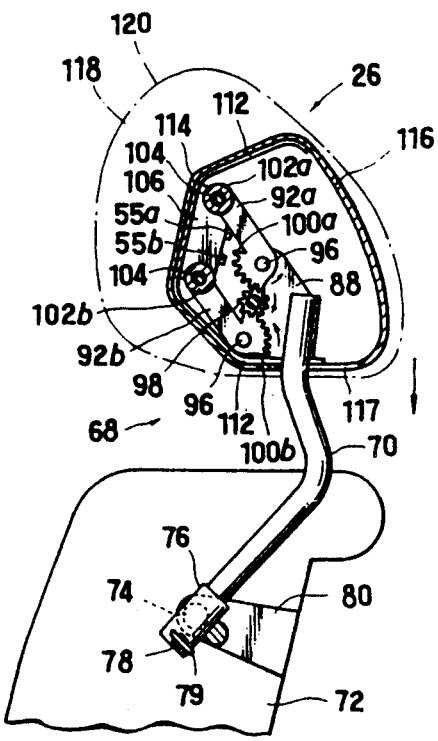
FIG. 5 is a longitudinally sectional view of the headrest, showing its uppermost limit level.

For facilitating the understanding, reference is now made to FIGS. 3, 4 and 5, in which FIG. 3 depicts the fore-and-aft movement of the headrest body (26) between the forward and backward limit points upon the top of the seat back (84), FIG. 4 depicts its displacement between the use position (at the backward limit point) and non-use position, and FIG. 5 indicates a vertical movement of the same headrest body (28) between the highest limit level and lowest limit level, showing particularly the headrest body (28) to be located at the highest limit level.

Referring now to FIG. 4, it will be understood that the headrest body (26) is displaced from the use position indicated by the two-dot line, where it is rested upon the top of the seat back (73), down to the non-use position indicated by the one-dot chain line, where it is inclined downwardly to contact the frontal surface of the seat back (72), thus being lowered away from or below the backward sight line (28) of a driver (P) on the front seat (FS), the sight line (28) running between the eyes of the driver (P) and the lower side of a rear glass of an automobile (A), thereby permitting the driver (P) to attain a better backward view field over the seat back (72) of the rear seat (RS) see also FIG. 1).

The automatic operation switch (12) is provided at an armrest (32) integral with the inner wall of a front door (30), as shown in FIG. 1. The switch (12) is adapted for controlling the drive of the headrest fore-and-aft motor (22) so as to cause displacement of the headrest body (26) between the use and non-use positions, with a one-touch switching operation. Preferably, the switch (12) is the one of a push button type with self-returnable switching structure, wherein depressing it turns on the switch per se and releasing the depress returns it to an initial "off" state, and further provided with a memory which stores in memory the "on" state once depressing on the switch (120 in order to retain an initial switch instruction, irrespective of another depress thereon. Hence, for example, during a drive of the headrest fore-and-aft motor (22) instructed by a first turning-on operation of the switch (12), a second turning-off operation of the same is interrupted by virtue of the first "on" state being memorized, to thereby keep on the first intended drive of the motor (12). With this one-touch switch (12), simply one-time depressing on it permits for controlling a normal and reverse drive of the motor (22), and thus making it easy to cause displacement of the headrest body (26) between the use and non-sue positions, as will become apparent later.

The automatic operation switch (12) is electrically connected with the central processing unit (20) (CUP), such that to operate that particular switch (12) will send a signal to the CPU (20), as in FIG. 2.

Looking now at FIG. 2, the CPU (20) includes a microcomputer (36). The microcomputer (36) is programmed properly, generally on the basis of step flows as shown in block flow charts of FIG. 7, as will be set forth later, and processes signals from switches to emit an appropriate control signal which is to be sent to the relay units (40) (37) and motors (22) (24) for controlling the former to effect an intended drive of the latter.

It is noted here that, as will be explained later, the location of the headrest body (26) is detected by the headrest angle detector (16), and the CPU (20), through that detector (16), determines a precise location of the headrest body (26) and emits a proper instruction as to in which direction the headrest body (26) should be moved. For example, if the headrest body (26) is located at the use position and it is desired to displace it to the non-use position, operating the automatic operation switch (12) accordingly will actuate the headrest angle detector (16) to determine the location of the headrest body (26), and the CPU (20) ascertains precisely where it is located, allowing displacement thereof from the use position to the non-use position.

The first relay unit (40) includes a reverse drive relay element (41) and a normal drive relay element (43), both of them being electrically connected with the headrest elevating motor (24) and also with the CPU (20), such that, as will be stated below, the former relay element (41) is for energizing the motor (24) to drive in a reverse direction, while the latter one (43) is for energizing same to drive in a normal direction.

The second relay unit (37), likewise, includes reverse and normal relay elements (38) (39), which are both electrically connected with the headrest fore-and-aft motor (22) and CPU (20), such that the former (38) is for energizing the motor (22) to drive in a reverse direction, while the latter one (43) is for energizing same drive in a normal direction.

In this context, let it be assumed that the headrest body (26) is located at a certain point in the use position as indicated by the two-dot chain line in FIG. 4 and the automatic operation switch (12) is turned on, with the headrest angle detector (16) detecting the location of the headrest body (26) to be within the use position. Then, the signal from the switch (12) is inputted to the CPU (20) which in turn outputs an instruction signal to the second relay unit (37). The normal drive relay element (38) in such relay unit (37) sets its contact (38-1) in contact with the associated make point (38a), while the other reverse drive relay element (39) brings its contact (39-1) to contact with the brake point (39b), thus energizing and driving the headrest fore-and-aft motor (22) to rotate in the reverse direction. The headrest body (26) is thereby displaced from the use position on the top of the seat back (72) to the non-use position forwardly thereof. On the other, let it be assumed that the headrest body (26) is located at the non-use position and the automatic operation switch (12) is turned on, with the headrest angle detector (16) detecting the headrest body (26) to be located at the non-use position. Then, in response to the signal of the switch (12), the CPU (20) outputs an instruction signal to the first relay unit (37), in which the normal drive relay element (38) is actuated to set its contact (38-1) in contact with the make point (38a) while the other reverse drive element (39) brings its contact (39-1) to contact with the brake point (39a), thus energizing and driving the motor (22) to rotate in the reverse direction. The headrest body (26) is thereby returned from the non-use position up to the use position.

The manual adjustment switch (14) includes a fore-and-aft adjustment switch element (42) and vertical adjustment switch element (44), as can be seen from FIG. 2. Preferably, this switch (14) is a seesaw-type, self-returnable one having a neutral switch area, first and second switch areas, but it may be other suitable ones such as a self-returnable push-type switch, or alternatively, those two switch elements (42) (44) may be provided separately from each other. The switch (14) is provided at an armrest (48) integral with the inner wall of a rear door (46).

The fore-and-aft and vertical adjustment switch elements (42) (44) are electrically connected with the CPU (20) and operable by an occupant on the rear seat (RS). The former (42) is so arranged that its first switch area (42a) is adapted for causing the forward movement of the headrest body (26) and its second switch area (42b) is adapted for causing the backward movement thereof, while on the other hand, the latter (44) is likewise so arranged that its first switch area (44a) is for causing the upward movement of the headrest body (26) and its second switch area (44b) is for causing the downward movement thereof.

Accordingly, assuming that, with the headrest body (26) being at the use position, the fore-and-aft adjutment switch element (42) is turned on at its first switch area (42a), then a signal is sent from the first switch are (42a) to the CPU (20) which then emits a reverse drive signal to the reverse drive relay element (39) of the fore-and-aft drive relay (37). Responsive thereto, the associated relay contact (39) is set in contact with the make point (39a), whilst the other relay contact (38) is left in contact with the brake point (38b), thus enernizing and driving the headrest fore-and-aft motor (22) to rotate in the reverse direction, whereby the headrest body (26) is moved forwardly within the given fore-and-aft rotation angle range ($\beta$). At this moment, if the switch element (42) is turned off, the associated relay contact (39-1) is brought to contact with the brake point (39b), thus deenergizing the motor (22) to stop the forward movement of the headrest body (26). Reversely, if the fore-and-aft adjustment switch element (42) is turned on at its second switch area (42b), then the CPU (20) emits a normal drive signal to the normal drive relay element (38) which sets its relay contact (38-1) in contact with the make point (38), while the other relay contact (39-1) is left in contact with the brake point (39b), thus driving the motor (22) to rotate in the normal direction, whereby the headrest body (26) is moved backwardly upon turning off the switch element (42), the motor (22) is ceased its normal drive, thereby stopping the foward movement of the headrest body (26).

Through operation of this fore-and-aft adjustment switch element (42), an occupant can adjust and set the headrest body (26) at a desired point in the fore-and-aft direction at the given use position.

The headrest angle detector (16) limits the aforementioned headrest displacement rage ($\alpha$) between the use and non-use positions, and the headrest fore-and-aft adjustment range ($\beta$). For that purpose, the detector (16) is preferably a potentiometer (17) which measures the rotation angle of the motor (22), thereby detecting the location of the headrest body (26) in reference to a motor rotation angle being measured. Such potentiometer (17), as shown in FIG. 2, is electrically connected with the CPU (20), which incorporates therein a headrest motion limit program in a cooperative relation with the potentiometer (17). In that program, there are set a backward limit point (i.e. the initial use position), a fore-and-aft adjustment limit point, and a non-use position of the headrest body (26) with respect to the seat back (72). Hence, the movement or displacement of the headrest body (26) is controlled to avoid its undesired or excessive motions through the CPU (20) which compares those set headrest motion limits with a motor rotation angle measured by the potentiometer (17) to provide a proper control over the drive of the motor (22). In this respect, let us assume, referring to FIG. 3, that the backward limit point (i.e. the initial use position) is preset in the CPU (20) as "$\theta1$", and the forward limit point is preset as "$\theta2$" therein. Then, during the fore-and-aft adjustment of the headrest body (26) being taken by the manual adjustment switch (14), the headrest body (26) is permitted to move forwardly and backwardly insofar as the potentiometer (17) presents its measurement result "$\theta2$" within the range of $\theta1 \leq \theta \leq \theta2$. In other words, the fore-and-aft movement of the headrest body (26) is confined to the preset range ($\beta$), and further when the headrest body reaches the foward limit point, the motor (22) is automatically ceased its drive, to thereby immediately stop the forward movement of the headrest body (26). Accordingly, it is seen that there is elminated an excessive movement of the headrest body (26) and secured a precise control thereover in the course of adjusting its fore-and-aft positions.

Further, assuming that the non-use position of the headrest body (26) is preset in the CPU (20) as "$\theta3$", the headrest body (26) is permitted to displace between the use and non-use positions, insofar as the potentiometer (17) presents its measurement result within the range of $\theta1 \leq \theta \leq 3$. Hence, it follows that, if the measurement value "$\theta$" of the potentiometer (17) reaches the preset backward limit value "$\theta1$", the fore-and-aft motor (22) is automatically caused to cease its normal drive, whereby the headrest body (26) is located at the initial use position indicated by the two-dot chain line in FIG. 4, and if the potentiometer (17) measures the foregoing preset non-use position value "$\theta3$", the motor (22) is then automatically stopped its drive so as to locate the headrest body (26) at the non-use position indicated by the one-dot chain line in FIG. 4.

It is, accordingly, to be seen that the above-define two measurement value ranges, "$\theta1 \leq \theta \leq \theta2$" and "$\theta1 \leq \theta \leq \theta3$", of the potentiometer (17) are respectively indicative of the fore-and-aft adjustment range of the headrest body (26) at the use position and the displacement range of the same between the initial use and non-use positions. The CPU (20) is therefore so programmed that, upon operating the automatic switch (12), the control instruction is directed to supervising the preset range of "$\theta1 \leq \theta \leq \theta3$" of the potentiometer (17), whereas upon operating the manual switch (14), the control is directed to supervising the other preset range of "$\theta1 \leq \theta \leq \theta2$" of the same (17). The interrelation among the limit values "$\theta1$", "$\theta2$" and "$\theta3$" are readily understandable from FIG. 8.

Figure 8:
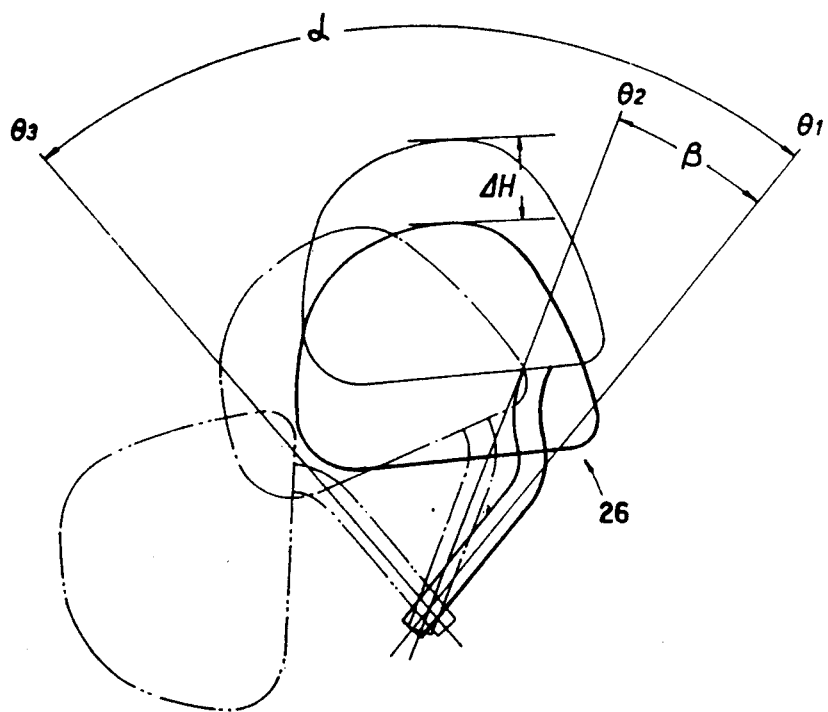
FIG. 8 is a schemata diagram to show the motion of the headrest.

With this structure, it is further to be seen that the headrest body (26) is controlled its movements between use and non-use positions (within the rotation angle range of "$\alpha$" as seen in FIG. 8) and between the forward and backward limit points (within the rotation angle range of "$\beta$" as in FIG. 8), independently, under the respective switching operations of the automatic switch (12) and manual switch (14). This is advantageously effective in avoiding unintended overrun of the headrest body (26) which is caused by an erroneous switching-on operation; namely, for example, if the fore-and-aft adjustment switch (42) is by mistake kept turned on at its first switch area (42a), the headrest body (26), which is being moved forwardly responsive to such "on" operation, is automatically stopped at the preset forward limit opoint which corresponds to the value limit ($\theta2$) for the potentiometer (17). Moreover, the headrest use-and-non-use angle range ($\alpha$) and headrest fore-and-aft adjustment range ($\beta$) can be respectively set by means of the potentiometer (17) with ease, which does not require other complicate mechanisms for that purpose and simplifies the structure of the device.

Having now regard to the vertical movement of the headrest body (26), if the vertical adjustment switch element (44) is turned on at its first switch area (44a), then the CPU (20) emits a reverse drive instruction signal to the reverse drive relay element (41) of the vertical drive relay (40), which in turn brings the associated relay contact (41-1) to contact with the make point (41a), while other contact (42-1) associated with the normal drive relay element (42) is left contacted with the brake point (42b), thus energizing and driving the headrest elevating motor (24) to rotate in the reverse direction. The headrest body (26) is thereby raised from the seat back (72) through a headrest drive mechanism (68) to be stated later. During such headrest raising, to turn off the vertical adjustment switch element (44) will bring the relay contact (41-1) to contact with the brake point (41b), to stop the upward movement of the headrest body (26). In that way, an occupant can adjust the vertical position of the headrest body (26) at a desired point. Reversely, turning on the second switch area (44b) of the switch element (44) causes the CPU (20) to emit a normal drive instruction signal to the normal drive relay element (42), which then brings the associated relay contact (42-1) to contact with the make point (42a), while other contact (41-1) associated with the reverse drive relay element (41) is left contacted with the brake point (41b), thus energing and driving the motor (24) to rotate in the normal direction, thereby causing the lowering of the headrest body (26).

Accordingly, with this system, the headrest body (26) may be adjusted its vertical positions at a desired point within the distance ($\Delta$ H) between its highest limit point and lowest limit point, so that an occupant may effect a fine adjustment of headrest height according to his or her taste, by operating the vertical adjustment switch element (44).

Preferably, the headrest elevating motor (24) is so designed as to drive at a low rate, in order to allow a fine height adjustment of the headrest body (26).

Designations (53) and (54) refer to over-current detecting resistances. The former resistance (53) is adapted for use in blocking the flow of an over-current to the headrest fore-and-aft motor (22), and the latter resistance (54) is for use in blocking the flow of an over-current to the headrest elevating motor (24). Specifically, in the event of an over-current being emerged due to an overload in those motors (22) (24), or the like, the CPU (20) detects it through the over-current detecting resistances (53) (54), and emits a drive stop signal to the relays (37) (40) so as to deenergize the motors (22) (24) to stop its drive. Practically, if the movements of the headrest body (26) is forcibly prevented by the reasons of an obstacle colliding with the headrest body (26) or of its being holded by an occupant against movement on purpose, an over-current will be produced in the circuit of the device, and immediately be detected by those two resistances (53) (54) to stop the drive of the motors (22) (24), which protects them against overheat or damage.

In accordance with the present invention, the foregoing vertical movable range ($\Delta$ H) of the headrest (26) is limited by utilizing such stop function of the second over-current detecting resistance (54) and forming a pair of spaced-apart upper and lower stopper protrusions (55a) (55b) in the headrest drive mechanism (68) to be described later. Namely, it is so arranged that, when the headrest (26) is moved upwardly and prevented from further upward movement by the upper stopper protrusion (55a), an over-current is generated in the electric circuit, and responsive thereto, the CPU (20) detects the over-current through the resistance (54) and cuts a current flow in the headrest elevating motor (24), to thereby stop the drive of the motor (24) and thus upward movement of the headrest body (26) at a given upper limit point, and that, likewise, when the headrest body (26) is lowered and limited its downward movement by the lower stopper protrusion (55b), the CPU (20) detects an over-current through the second resistance (54) to cease the drive of the motor (24), thereby stopping the downward movement of the headrest body (26) at a given lower limit point. In that way, an electrical limit switch is provided against the vertical movement of the headrest body (26), instead of using an ordinary mechanical limit switch.

As shown in FIG. 2, the CPU (20), headrest fore-and-aft motor (22) and headrest elevating motor (24) are electrically connected with a power-supply circuit (57) which includes a constant voltage circuit (56). The power-supply circuit (57) is electrically connected via an ignition switch (58) with a positive pole of a battery (59).

As seen from FIGS. 1 and 2, there is further provided a voltage control circuit (18) in the circuit of the device (10). The voltage control circuit (18) controls or varies a voltage sent from the power-supply circuit (57) so as to change the drive or rotation rate of the headrest fore-and-aft motor (22). As shown, the voltage control circuit (18) is interposed between and electrically connected with the CPU (20) and the motor (22), such that an instruction signal, which is emitted from the CPU (20) by operation of the automatic and manual switches (12) (14), is sent to the voltage control circuit (18), which in turn applies a varied voltage to the motor (22). Stated more precisely, if a signal originated from the automatic switch (12) is imparted to the voltage control circuit (18), a high voltage is applied from the circuit (18) to the motor (22), which thus is driven at a high rotation rate, and on the other hand if a signal originated from the manual switch (14) is imparted to the circuit (18), a low voltage is applied therefrom to the motor (22), which is driven at a low rotation rate. Therefore, the operation of the automatic switch (12) for displacement of the headrest body (26) between the use and non-use positions produces a high drive rate of the motor (22) to move the headrest body (26) rapidly, whereas the operation of the fore-and-aft adjustment switch (42) produces a low drive rate of the motor (22) to raise or lower the headrest body (26) slowly, permitting a fine adjustment thereof in the fore-and-aft directions upon the seat back (72). An occupant can immediately attain a good view field and make a fine, precise adjustment of the headrest at a desired fore-and-aft point.

A seating detector (62) is provided in the seat cushion (62) of the rear seat (RS). The seating detector (62) is adapted to detect the presence or absence of a rear-seat occupant on the rear seat (RS). Preferably, the detector (62) comprises a pressure sensitive switch or sensor. As shown in FIGS. 1 and 2, the seating detector (62) is electrically connected with the CPU (20). Specifically when the seating detector (62) detects the presence of a rear-seat occupant on the rear seat (RS), a signal is sent therefrom to the CPU (20), which determines such occupant presence at the rear seat (RS) and blocks any signal from the automatic operation switch (12), while permitting flow of signals form the fore-and-aft adjustment switch element (42) and vertical adjustment switch element (44). This means that when the rear seat (RS) is taken by someone, the automatic operation switch (12) is prohibited from use, whereby in that particular case, the headrest body (26) is prevented against displacement to the non-use position, but permitted for adjustment of its vertical or fore-and-aft positions at the use position by the rear-occupant's operation of those tow switches (42) (44). Accordingly, in the case of an occupant being present on the rear seat (RS), any unintentional or erroneous operation by a front-seat occupant or driver sitting on the rear seat (RS) is assuredly blocked through the seating detector (62) and CPU (20), to prevent the movement of the headrest body (26) which might damage or injure the rear-seat occupant.

Where the presence of an occupant on the rear seat (RS) is not detected by the seating detector (62), then the CPU (20) determines the absence of occupant on the rear seat (RS), allowing the use of the automatic operation switch (12), but blocking any signal sent from the fore-and-aft adjustment and vertical adjustment switch elements (42) (44), whereby in the absence of an occupant on the rear seat (RS), a driver on the front seat (FS) can operate the automatic switch (12) to displace the headrest body (26) between the use and non-use positions.

The seating detector (62) is preferably a pressure sensitive switch which is to be turned on, responsive to a pressure being applied thereto by a weight of an occupant.

Figure 7A:
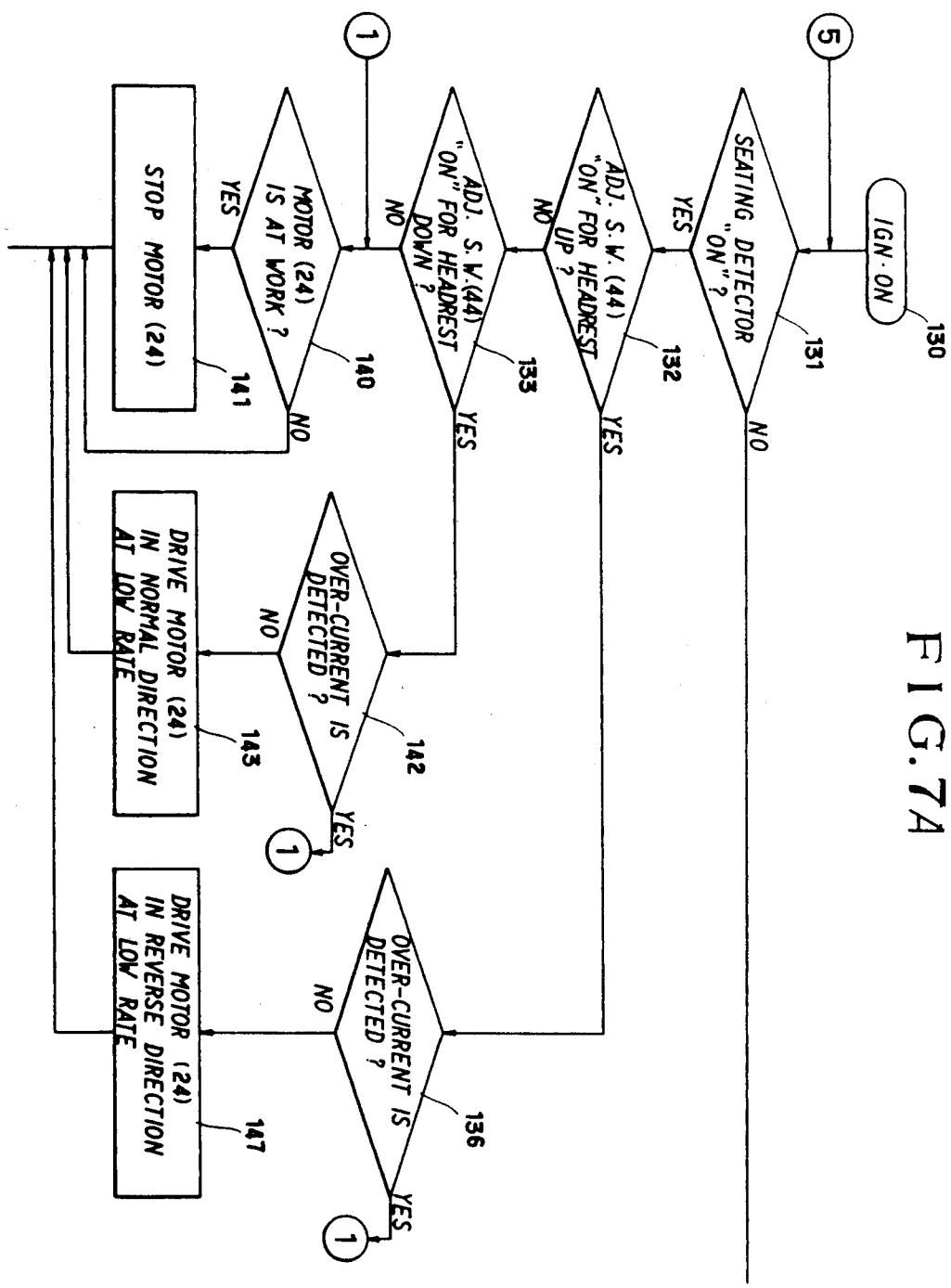
FIG. 7 shows a general view of three sections of block flow charts, consisting of FIG. 7A, FIG. 7B and FIG. 7C.
Figure 7B:
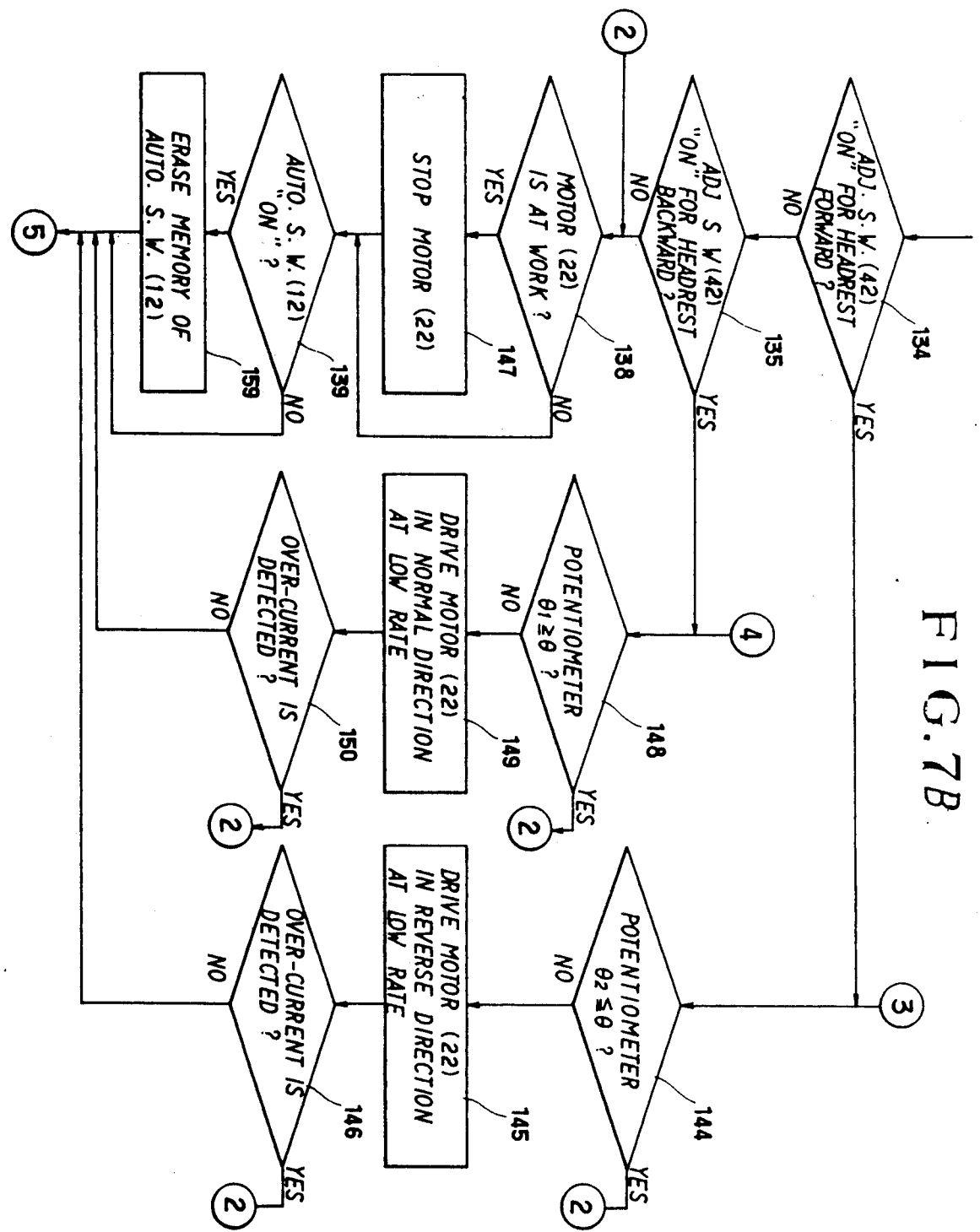
Figure 7C:
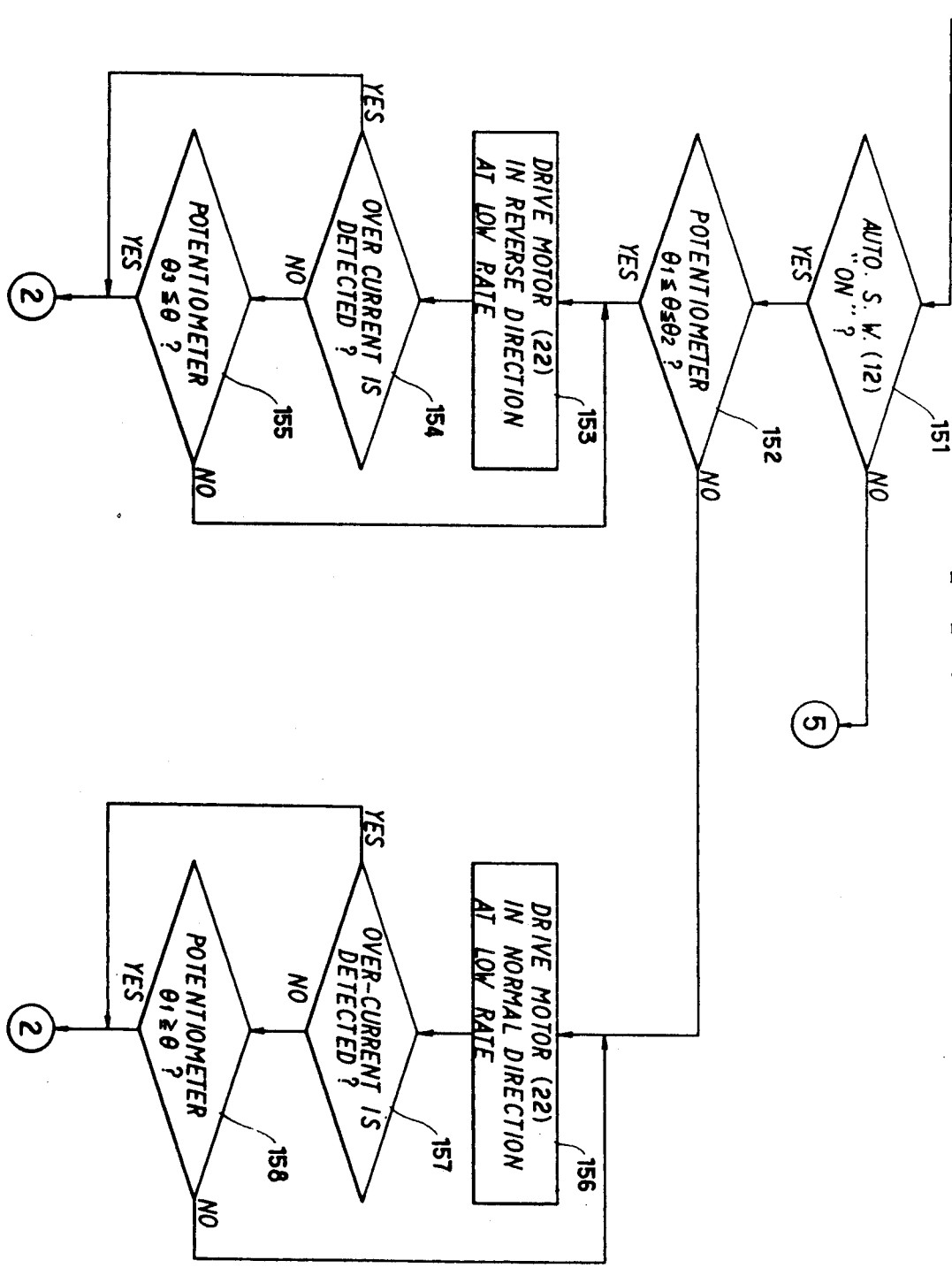

Reference is now made to FIG. 7 which is broken down into FIGS. 7A, 7B and 7C. The block flow chart shown therein are dedicated to providing a general view of the programs set in the CPU (20) for effecting a proper control of the headrest (26). Hereinafter, a specific description will be made of the program and instruction flow in the headrest control system (10), by referring to FIGS. 7A 7B and 7C.

Firstly, reference being made to FIG. 7A, a steps for controlling the above-described headrest body (26) begins with the turning on of an ignition switch (58) which is a main switch in the headrest control device (10), as indicated at block (130), and then goes to a decision block (131) for determining whether the seating detector (62) is turned on or not. If an occupant sits on the rear seat (RS) the seating detector (62) detects a pressure of the occupant, thus being turned on. Hence, an affirmative decision "YES" is given at the block (131). Then, at a next block (132), it is determined whether or not the headrest vertical adjustment switch element (44) of the manual adjustment switch (14) is turned on at its first switch area (44a) for causing forward movement of the headrest body (26), and also at a block (132), it is determined whether the same switch element (44) is turned on its second switch area (44b) for causing the backward movement of the headrest body (26) or not. It is noted here that to turn on the first switch area (44a) leads automatically to the turning-off of the other second switch area (44b), or vice versus. Now, let us assume that the vertical adjustment switch element (44) is turned on at its first switch area (44a) in order to adjust the vertical positions of the headrest body (26), without operating the fore-and-aft adjustment switch element (42). In that case, the block (132) gives "YES" decision, and then a next step is turned to a detecting of an over-current, at a block (136), determining whether the resistance (54) detects an over-current being generated towards the headrest elevating motor (24). If no over-current occurs in the circuit, an instruction is given at a block (137), for driving the motor (24) to rotate in a reverse direction. At this stage, since the fore-an-aft adjustment switch element (42) is in an imperative state, the step flow passes through two blocks (134) (135) associated with that switch element (42), with negative decision "NO", and additionally because of the automatic operation switch (18) being an "off" state, "NO" decision is made at both blocks (138) (139). Thus, the headrest elevating motor (24) is driven at a low rate in the reverse direction, causing the upward movement of the headrest body (26), and if the headrest body (26) reaches an upper limit point, where it is prevented by the upper stopper protrusion (55a) against further upward movement, then an over-current is detected by the resistance (54), therefore, at a block (136), "YES" is decided, and it is checked up, at a block (140), whether or not the headrest elevating motor (24) is at work. Since the motor (24) is indeed at work, the block (140) gives "YES" decision, whereupon the step now ends with an instruction to cease the reverse drive of the motor (24) at a block (141), thus stopping the upward movement of the headrest body (26). Contrary to this step flow, in the course of the headrest body (26) being moved to the upper limit point, if the vertical adjustment switch (44) is turned off in an attempt to stop the headrest body (26) at a desired point between the upper and lower limit points (i.e. Δ H), then "NO" is decided at the block (132) and "YES" is decided at the block (140), resulting thus in a motor stop instruction at the block (141). In this way, it is to be seen that the headrest body (26) may be adjusted its vertical position at a desired point insofar it is located within the aforementioned fore-and-aft adjustment range (β).

Assuming further that the vertical adjustment switch (44) is turned on at its second switch area (44a) to cause downward movement of the headrest body (26), the block (133) gives an affirmative answer "YES", leading the step flow to an over-current determination at a bock (142), in which "NO" is decided because no forcible counter force is exerted on the drive of the motor (24) and thus no over-current occurs in the circuit. Then, at a block (143), the motor (24) is instructed to drive at a slow rate in the normal direction. When the headrest body (26) is lowered and reaches the lower limit point, where it is prevented by the lower stopper protrusion (55b) against further downward movement, an over-current is detected by the resistance (54), giving "YES" decision at the block (142), in which case, the step is led to the block (140) for checking up whether the motor (24) is at work or not, and thereafter an instruction is given at the block (141) to cease the normal drive of the motor (24), thereby stopping the downward movement of the headrest body (26). Contrary thereto, in the course of headrest body (26) being moved to the lower limit point, if the vertical adjustment switch (44) is turned off to stop the headrest body (26) at a desired point, then "NO" is decided at the block (133) and "YES" at the block (140), resulting in an instruction at the block (141) to cease the drive of the motor (24), thereby stopping the downward movement of the headrest body (26).

This over-current limit switching method, as stated previously, is also effective in such case where an object or occupant interferes with the vertical movement of the headrest body (26) within the range (Δ H). Namely, if such is the case, an over-current is generated in the circuit and detected by the resistance (54), which gives "YES" decision at the relevant block (136), and therefore, at the subsequent block (140), "YES" is decided, and a motor stop instruction is given at the block (141), whereby the motor (24) s deenergized to cease its drive, and protected against overheat or damage.

Now, let it be assumed that the fore-and-aft adjustment switch (42) is turned on at its first switch area (42a) in order to adjust the fore-and-aft position of the headrest body (26), without operating the above-described vertical adjustment switch (44). Then, the step proceeds, with "NO" decision, through the three blocks (132) (133) (140), and accordingly an affirmative decision, "YES", in taken at the block (134) associated with the fore-and-aft adjustment switch (42), by referring to FIG. 7B. The step flow goes to a block (144) associated with the potentiometer (17), at which it is determined whether the measurement value (θ) of the potentiometer (17) is greater than the forward limit point value (θ2), or not. Since, practically, the former value (θ) is less than the latter value (θ2) due to the headrest body (26) being moved within the fore-and-aft adjustment range (β), a negative decision "NO" is made at this particular block (144), and therefore at a block (145) an instruction is given to drive the headrest fore-and-aft motor (22) at a low rate (speed). At this moment, it is checked up at a block (146) whether or not an over-current is detected by the resistance (53), but as the motor (22) works on well in this case, "NO" is decided at that block (146), permitting the motor (22) to drive at slow rate in the reverse direction, until the measurement value (θ) of the potentiometer (17) reaches the value (θ2). Then, when the headrest body (26) reaches the forward limit point, with the measurement value (θ) of the potentiometer (17) amounting to the forward limit point value (θ2), the block (144) gives "YES" decision, and the step goes to the block (138) for determining whether or not the motor (22) is at work, and since the motor (22) is being driven, "YES" is decided there, leading the step flow to the block (147) which instructs the motor (22) to cease its drive, whereby the headrest body (26) is stopped at the forward limit point. On the contrary, during the forward movement of the headrest body (26), before the measurement value (θ) of the potentiometer (17) amounts to the forward limit point value (θ2), if the fore-and-aft adjustment switch (42) is turned off, the step flow proceeds, with "NO" decision, through both blocks (134) (135), and after confirming "YES" decision at the block (138) due to the on-going drive of the motor (22), a motor stop instruction is given at the block (14 ) to cease the drive of the motor (22) and stop the headrest body (26), whereby the headrest body (26) may be adjusted its position at a desired point and preset there within the fore-and-aft adjustment range ($\beta$).

Assuming, on the other hand, that the fore-and-aft adjustment switch (42) is turned on at its second switch (42b) to cause the backward movement of the headrest body (26) within the fore-and-aft adjustment range ($\beta$), the step flow starts with "NO" decision at the block (134) related to its first switch area (44a), and then gives "YES" decision at the block (135), confirming the present "on" state of that second switch area (44b). The step is led to a block (148) associated with the potentiometer (17), in which it is determined whether or not the measurement value ($\theta$) of the potentiometer (17) is less than the backward limit point value ($\theta$1) (equal to the initial use position). Since, practically the former value ($\theta$) is greater than the latter value ($\theta$1), the decision of the block (148) is in the negative as "NO". Thus, at a next instruction block (149), the motor (22) is instructed to drive at a low rate in the normal direction, during which, it is checked up at a block (150) as to whether an over-current is detected by the resistance (53) or not, and if "NO" is decided there, the motor (22) continues to be driven at a low rate in the normal direction, until the measurement value ($\theta$) of the potentiometer (17) amounts to the backward limit point value ($\theta$1). When the headrest boyd (26) is moved backwardly and reaches the backward limit point, with the the value ($\theta$) of the potentiometer (17) also reaching the backward limit point value ($\theta$1), the step is led to the block (148), at which "YES" is decided, and brought to the block (138) for checking up whether the motor (22) is at work or not. As the motor (22) is being driven "YES" is decided at that block (138), which leads the step to the instruction block (147), at which the motor (22) is instructed to cease its drive, whereby the headrest body (26) is stopped at the backward limit point. On the contrary, during the backward movement of the headrest body (26), prior to the measurement value ($\theta$) of the potentiometer (17) reaching the backward limit point value ($\theta$1), if the fore-and-aft adjustment switch (42) is turned off, the step flow proceeds through both blocks (134) (135) with "NO" decision, and with "YES" at the block (138) as a result of which, the motor (22) is instructed to cease its drive at the block (147). Hence, the headrest body (26) is stopped at a certain point within the fore-and-aft adjustment range ($\beta$), thereby permitting the headrest body (26) to be adjusted its backward limit point as desired and preset there within such range ($\beta$). Here, in the case of an over-current is detected by the resistance (53) during such fore-and-aft movement of the headrest body (26), which means that the related block (146) or (150) gives "YES" decision, then the step goes to the block (118) for checking up whether or not the motor (22) is at work. As the motor (22) is being driven, "YES" is decided at that block (138), and the step ends with a motor stop instruction at the block (147), instructing the motor (22) to cease its drive. Accordingly, it is appreciated that if the headrest body (26) being moved is forcibly halted or pressed by an occupant or due to interference of an object the motor (22) is automatically ceased its drive and thereby prevented from being overheated or damaged.

Further, in absence of an occupant on the rear seat (RS), with the seating detector (62) failing to detect his or her presence, reference is made to FIG. 7A: The block (131) offers "NO" decision and then, the CPU (20) interrupts any signal sent from the fore-and-aft and vertical adjustment switches (42) (44), with the result that both of them are not permitted to be operated. The step flow goes to a decision block (151), as shown in FIG. 7C, at which it is determined whether or not the automatic operation switch (12) is turned on.

If a driver (P) turns on the automatic operation switch (12), "YES" is decided at the block (151) and then, at a subsequent block (152), it is determined whether or not the measurement value ($\theta$) of the potentiometer (17) falls within the range of $\theta 1 \leq \theta \leq \theta 2$, to thereby ascertain whether the headrest body (26) is located within the fore-and-aft adjustment range ($\beta$), or not. If the headrest body (26) is located within such range, "YES" is decided at the block (152), thus leading the step flow to an instruction block (153) wherein the motor (22) is instructed to drive at a high rate in the reverse direction, whereupon the headrest body (26) is quickly displaced form the use position to the non-use position, as seen in FIGS. 3 and 4. Of course, during such headrest displacement, it is checked up at the block (152) as to whether the resistance (53) detects an over-current flow toward the motor (22), or not, and if "NO" is decided there, then it is determined at a next block (155) whether or not the measurement value ($\theta$) of the potentiometer (17) reaches the forward limit point value ($\theta$3). If "NO" is decided there, the motor (22) continues to be driven until the value ($\theta$) of the potentiometer (17) reaches such limit value ($\theta$3). This means that the headrest body (26) continues to be displaced towards the non-use position until it reaches there. When the headrest body (26) reaches the non-use position, with the value ($\theta$) of the potentiometer (17) amounting to the non-use limit point ($\theta$3), the block (155) gives "YES" decision, and the step is led to another block (138) in FIG. 7B, in which "YES" decision is given due to the motor (22) being at work, and then at the block (147), the motor (22) is instructed to cease its drive. Thereafter, the step undergoes the determination at a block (139) as to whether the automatic operation switch (12) is in an "on" state, or not, and as the switch (12) stands "on", the block (139) presents "YES" decision. Consequently, a memory of the automatic operation switch (12), which stores the "on" state, acts to erase it.

Furthermore, let us assume that the automatic operation switch (12) is turned on, with the headrest body (26) being located at the non-use position In that case, referring to FIG. 7C, "YES" is decided at the block (151), and then at the block (152). it is determined whether or not the measurement value ($\theta$) of the potentiometer (17) falls within the range of $\theta 1 \leq \theta \leq \theta 2$. By reason of the headrest body (26) being located at that non-use position, indicating the potentiometers (17) to measure such greater value ($\theta$3), a negative decision "NO" is taken at that block (152), which directs the step to an instruction block (156) in which the motor (22) is instructed to drive at a high rate in the normal direction, whereby the headrest body (26) is rapidly displaced from the non-use position to the use position, during which, at a block (157), it is checked up whether an over-current flow towards the motor (12) is detected by the resistance (53) or not. If "NO" is decided there, the headrest body (26) continues to be displaced towards the use position, with the value ($\theta$) of the potentiometer (17) coming to the backward limit point value ($\theta$1). When the potentiometer (17) measures the latter value ($\theta$1), "YES" is decided at a block (158), and the step flow is brought to the block (138) in FIG. 7B, in which "YES" is decided because of the on-going drive of the motor (12), with the result that at the block (147) an instruction is given for ceasing the drive of the motor (12). Then, after checking up whether the automatic operation switch (12) is in an "on" state or not, at the block (139) and giving "YES" decision there, the last instruction block (159) instructs the automatic operation switch (12) to erase such "on" state stored in memory so as to place the switch (12) per se in a normal condition for ready use.

It is noted that during the drive of the motor (22), a generation of over-current detected by the resistance (53), irrespective of the headrest body (26) being located anywere at the above-described headrest movable ranges, results in such step flow wherein "YES" is decided in either of the relevant blocks (154) (158), then also "YES" is given in the block (138), and the motor (22) is ceased its drive at the block (147), so that the motor (22) is protected assuredly against over-heat or damage by that over-current.

From the descriptions above, it is to be appreciated that the foregoing two movable ranges of the headrest body (26) may be adjusted individually or indedpendently of each other, by means of the potentiometer (17); that is to say, the displacement range ($\alpha$) between the use and non-use positions, and the fore-and-aft adjustment range ($\beta$) between the forward and backward limit points are to be adjusted independently of each other by the measurement by the potentiometer (17) of the rotation angle of the headrest fore-and-aft motor (22) in accordance with the given step flows set in the CPU (20) individually for those two movable ranges ($\alpha$) ($\beta$). Therefore, when adjusting the head support point within a given fore-and-aft adjustment range ($\beta$) by operation of the manual adjustment switch (14), the headrest body (26) is stopped at the set forward or backward limit points ($\theta 2$) ($\theta 1$) in an assured way, even if the switch (14) is erroneously kept turned on to allow continued movement, without being move on to the non-use position ($\theta 3$) or moved excessively backwardly beyond the backward limit point ($\theta 1$). Thus, there is no possibility of giving any damage, psychologically or physically to an occupant adjacent the headrest body (26).

Moreover, it is appreciated that the rotation rate (speed) of the headrest fore-and-aft motor (22) is changeable by virtue of the voltage control circuit (18), such that the rotation rate is increased when operating the automatic operation switch (12) while being decreased when operating the manual operation switch (14). Accordingly, the headrest body (26) is quickly displaced between the use and non-use use positions through the automatic switch (12), whereas it can be finely adjusted in the fore-and-aft direction due to its slow movement, through the manual switch (14).

The above descriptions have been made in reference to the illustrated embodiments, but the present invention is not limited thereto, but any other modifications, replacements and additions may structurally be possible without departing form the spirit and scope of the appended claims. For example, the device and method in the present invention may be only applied to the fore-and-aft adjustment of the headrest (26) under the control of the headrest fore-and-aft motor (22), instead of providing both headrest displacement and fore-and-aft adjusting movement that have been discussed.

What is claimed is:

1. A method for controlling a headrest in automobile, in which said headrest is movably mounted on a seat such as to be movable between a use position for supporting a head of an occupant on said seat and a non-use position which allows another occupant on another seat to attain a good forward or backward view field, and said headrest is caused to move between said use and non-use positions by operation of an automatic operation switch, while being adjustable in a fore-and-aft direction within said use position by operation a manual adjustment switch, said method comprising the steps of:
   presetting said use position and non-use position, to thereby provided a certain headrest displacement range, within which said headrest is displaceable therebetween;
   presetting a forward limit point and backward limit point within said use position, to thereby provided a certain headrest fore-and-aft adjustment range within which said headrest is adjustable in said fore-and-aft direction;
   wherein said first and second presetting steps are carried out, independently of each other, by means of a headrest angle detector which detects a location of said headrest;
   supervising automatically said headrest displacement range, responsive to operation of said automatic operation switch; and
   supervising automatically said headrest fore-and-aft adjustment range, responsive to operation of said manual adjustment switch.

2. The method as defined in claim 1, wherein there is provided a voltage control circuit which controls a voltage to be applied to a motor for causing said displacement and fore-and-aft adjustment of said headrest, and wherein said method further includes the steps of:
   (a) driving said motor at a high rate, when said headrest is displaced between said use and non-use positions by operation of said automatic operation switch; and
   (b) driving said motor at a low rate, when said headrest is adjusted in said fore-and-aft adjustment range by operation of said manual adjustment switch.

3. A device for controlling a headrest in an automobile, in which said headrest is movably mounted on a top of a set back of a seat, such as to be movable between a use position for supporting a head of an occupant on said seat and a non-use position below a sight line of another occupant on another seat, thereby attaining a good forward or backward view field, said device comprising:
   a motor for causing movement of said headrest;
   an automatic operation switch for controlling said motor so as to cause said headrest to move between said use and non-use positions, said automatic operation switch being disposed adjacent to said another occupant;
   a manual adjustment switch for controlling said motor so as to effect fine adjustment in position of said headrest in a fore-and-aft direction within said use position, said manual adjustment switch being disposed adjacent to said occupant;
   a central processing unit which receives signals from said automatic operation switch and manual adjustment switch, then processes them according to a predetermined program, and emits a proper signal for causing an intended drive of said motor;
   a headrest angle detector which permits presetting a forward limit and a backward limit with regard to said displacement of said headrest between said use and non-use positions, and supervising those two limits to avoid an excessive movement of said headrest therebeyond, in response to said automatic operation switch, through an interconnective relation with said central processing unit, wherein said headrest angle detector permits presetting the two limits with regard to said before and after adjustment of said headrest within said use position, and supervising said two limits to avoid an excessive movement of said headrest therebeyond, in response to said manual adjustment switch, through an interconnective relation with said central processing unit, said two detectors being capable of being activated, independently of each other; and a voltage control circuit which controls a voltage to be applied to said motor in response to a signal from said central processing unit, in order to increase said voltage, responsive to said automatic operation switch being operated, thereby causing said motor to drive at a high rate, and decrease said voltage, responsive to said manual adjustment switch being operated, thereby causing said motor to drive at a low rate.

4. The device as defined in claim 3, wherein said headrest angle detector comprises a potentiometer which measures the rotation angle of said motor to detect said angle of said headrest.

5. The device as defined in claim 3, wherein said device further comprises a second motor for causing vertical movement of said headrest relative to said seat back, and wherein said manual adjustment switch is electrically connected with said second motor via said central processing unit, so that a fine adjustment of said headrest in height is effected by control of said motor through operation of said manual adjustment switch.

* * * * *